H. T. NOBLE.
COTTON PICKER.
APPLICATION FILED AUG. 30, 1912.
1,086,205.
Patented Feb. 3, 1914.
2 SHEETS—SHEET 2.
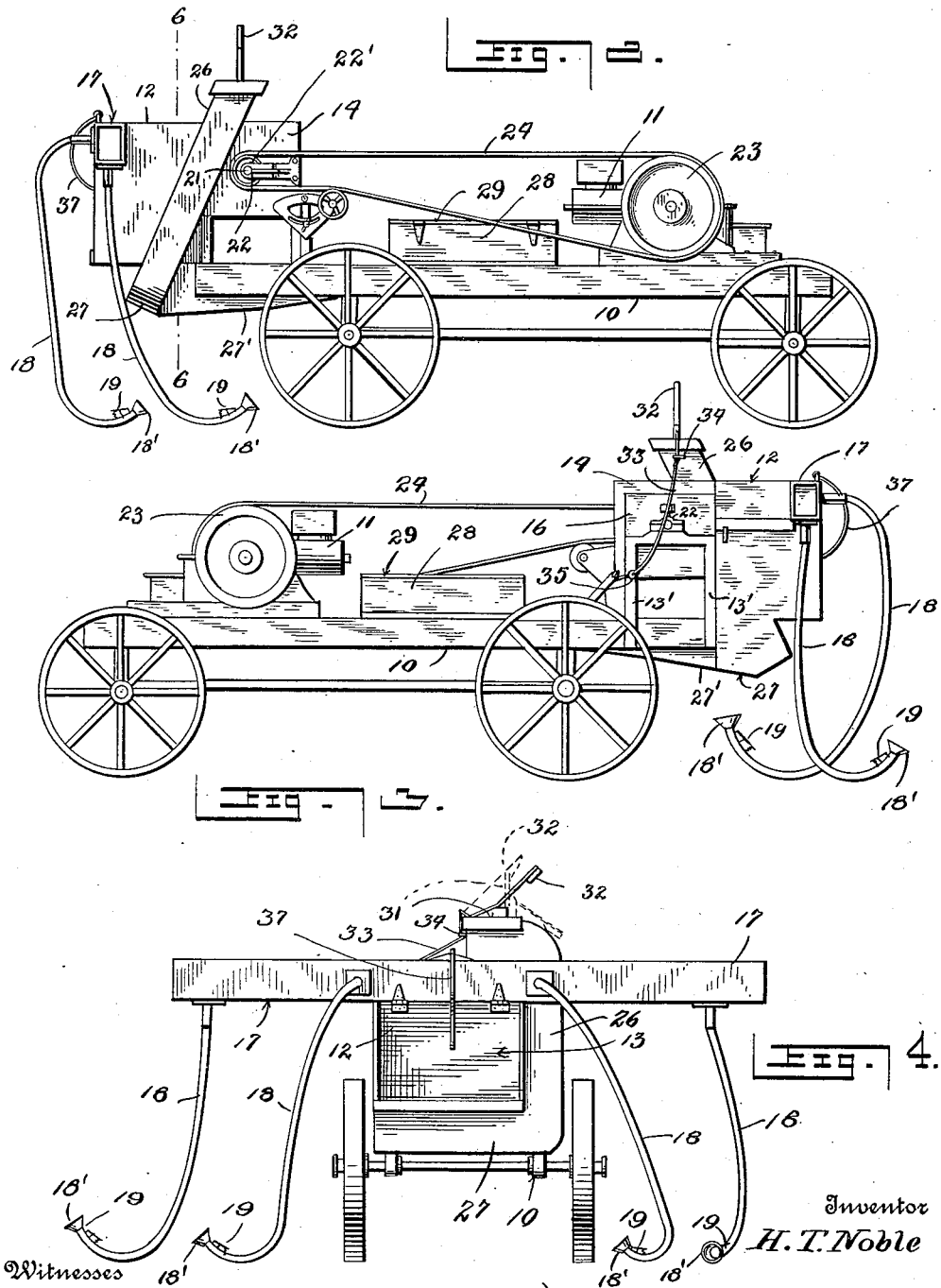
Witnesses
C. J. MacCarter
Francis Boyle
Inventor
H. T. Noble
By Chandler & Chandler
Attorney

UNITED STATES PATENT OFFICE.

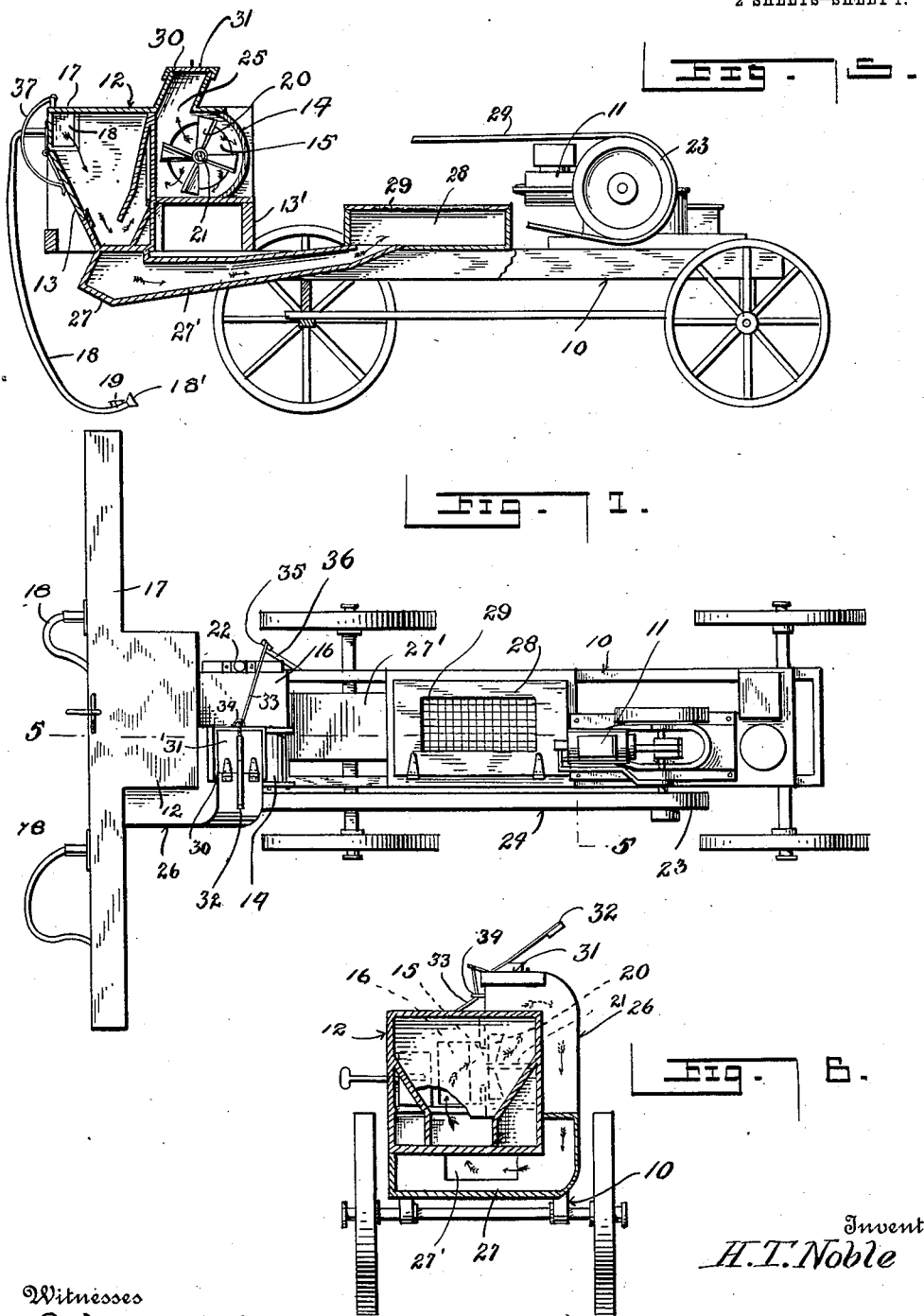

HARRISON T. NOBLE, OF TOGO, OKLAHOMA.

COTTON-PICKER.

1,086,205.  Specification of Letters Patent.  Patented Feb. 3, 1914.

Application filed August 30, 1912. Serial No. 717,907.

*To all whom it may concern:*

Be it known that I, HARRISON T. NOBLE, a citizen of the United States, residing at Togo, in the county of Major, State of Oklahoma, have invented certain new and useful Improvements in Cotton-Pickers; and I do hereby declare the following to be a full, clear, and exact description of the invention, such as will enable others skilled in the art to which it appertains to make and use the same.

This invention relates to cotton pickers, and has for an object to improve that class of cotton pickers described in U. S. Letters Patent issued to me on the 25th day of January, 1910, No. 947,559, by the provision of a novel pneumatic conveyer and cotton receptacle.

With the above object in view, the invention consists of certain novel details of construction and combination of parts hereinafter fully described and claimed, it being understood that various modifications may be made in the minor details of construction within the scope of the appended claim.

In the accompanying drawings forming part of this specification, Figure 1 is a plan view of the device. Fig. 2 is a side elevation of the device. Fig. 3 is a side elevation of the reverse side from that shown in Fig. 2. Fig. 4 is a rear elevation of the device. Fig. 5 is a longitudinal sectional view taken on the line 5—5 Fig. 1. Fig. 6 is a cross sectional view taken on the line 6—6 Fig. 2.

Referring now to the drawings, in which like characters of reference designate similar parts, 10 designates a wheeled wagon, upon the forward end of which is supported a gas engine 11 or other motor. Upon the rear end of the wagon is supported a box 12, which is provided with a hinged door 13 on the rear side. Supported upon posts 13' carried by the wagon in advance of the box is a fan casing 14, having a centrally disposed suction opening 15 in one side which communicates directly with an air tight casing 16 secured to the side of the fan casing, the air tight casing opening into the box 12.

An intake conduit 17 is supported in horizontal position transversely across the rear upper corner of the box, and communicates through an opening 18 with the box. At intervals throughout the longitudinal extent of the conduit and in communication therewith, are a plurality of suction tubes 18, each having mounted at its free end a picker nozzle 18' formed with a flared open mouth. In each picker nozzle is a lever actuated spring controlled cut off valve 19, which is adapted to regulate the supply of cotton gathered through said suction tube and conveyed through said conduit and communicating box and air tight casing to said fan casing. Working in said fan casing is a suction fan 20 which is mounted upon a shaft 21 that is journaled in bearings 22 carried on the outer sides of the fan casing and air tight casing. A driving pulley 22' is fixed to the shaft and over this driving pulley and the engine pulley 23 a belt 24 is trained and actuates the fan.

The fan casing is provided at the top with an outlet opening 25. A pneumatic conveyer conduit 26 is fixed to one side of the fan casing and extends above and below the fan casing, the conduit inclining rearwardly and downwardly along one side of the box 12, and opening at the lower end into a conduit 27, which extends transversely across the bottom of the box, and which in turn opens into a forwardly and upwardly inclined conduit 27' that extends longitudinally of the wagon and communicates at the end with a cotton receptacle 28, which is closed by a hinged cover 29. The conduit 26 is provided with an opening 30 which registers with the fan casing discharge opening 25, and the upper end of the conduit 25 is closed by a hinged door 31.

In operation, suppose that the pneumatic conveyer door is closed. The cotton which is drawn into the fan casing by the suction of the fan is ejected through the discharge opening of the fan casing into the pneumatic conveyer and is thence conveyed through the conveyer by the blast from the fan into the cotton receptacle 28. Upon the receptacle and pneumatic conveyer being filled with the cotton, the blast from the fan will blow the door 31 of the pneumatic conveyer open with a resultant ejection of the cotton through the upper end of the conveyer, thus giving visible evidence that the cotton receptacle and conveyer is choked with the accumulated cotton.

The door 31 is provided at the rear hinged edge with a counter-balancing weight 32 which serves to maintain the door in open position when open, and for closing the door, a cable 33 is attached to the free edge of the door and trained through a guide eye 34 carried on the edge of the upper end of the conduit, as shown, the cable being thence carried forwardly along the outer side of the air tight casing 16 and trained through a guide eye 35 carried on one of the posts which support the fan casing, the cable being terminally equipped with a grip 36 by means of which the cable may be pulled to open the door.

The hinged door 13 of the box 12 is normally held closed by a bowed spring 37, and may be rocked open against the tension of this spring to facilitate access to the interior of the box for the removal of any cotton which may accumulate therein.

What is claimed is:—

In a cotton picking machine, a durigable support, a box thereon, a fan casing on said support, an air-tight casing on one side of said fan casing communicating with said box and communicating with a centrally disposed intake opening on said fan casing, a conduit mounted to extend horizontally across said box and communicating therewith, a plurality of suction tubes carried by and communicating with said conduit, a receptacle on said support, a pneumatic conduit communicating with said fan and with said receptacle, said conduit extending above said fan and having an open upper end, and a counter-balanced door normally closing said open upper end.

In testimony whereof, I affix my signature, in presence of two witnesses.

HARRISON T. NOBLE.

Witnesses:
S. T. SLOAP,
B. C. NICOLA.

Copies of this patent may be obtained for five cents each, by addressing the "Commissioner of Patents, Washington, D. C."